United States Patent
Serkh et al.

(10) Patent No.: US 9,206,892 B2
(45) Date of Patent: Dec. 8, 2015

(54) ISOLATING DECOUPLER

(71) Applicant: THE GATES CORPORATION, Denver, CO (US)

(72) Inventors: Alexander Serkh, Troy, MI (US); Dean Schneider, Washington, MI (US); Yahya Hodjat, Oxford, MI (US)

(73) Assignee: GATES CORPORATION, Denver, CO (US)

( * ) Notice: Subject to any disclaimer, the term of this patent is extended or adjusted under 35 U.S.C. 154(b) by 65 days.

(21) Appl. No.: 14/248,162

(22) Filed: Apr. 8, 2014

(65) Prior Publication Data

US 2015/0285366 A1    Oct. 8, 2015

(51) Int. Cl.
| | |
|---|---|
| F16D 3/00 | (2006.01) |
| F16H 55/14 | (2006.01) |
| F16H 55/36 | (2006.01) |
| F16H 9/00 | (2006.01) |
| F16H 59/00 | (2006.01) |
| F16H 61/00 | (2006.01) |
| F16H 63/00 | (2006.01) |
| F16D 41/20 | (2006.01) |

(52) U.S. Cl.
CPC .............. F16H 55/36 (2013.01); F16D 41/206 (2013.01); *F16H 2055/366* (2013.01)

(58) Field of Classification Search
CPC ....... F16D 41/206; F16D 7/022; F16H 55/36; E05Y 2201/49
USPC ...................................... 474/94, 70
See application file for complete search history.

(56) References Cited

U.S. PATENT DOCUMENTS

| | | | | |
|---|---|---|---|---|
| 720,910 | A * | 2/1903 | Fox .......................... | B41F 19/00 101/226 |
| 736,333 | A * | 8/1903 | Meyer ....................... | F16F 1/04 267/155 |
| 3,618,730 | A * | 11/1971 | Mould, III ............ | F16D 43/211 192/56.2 |
| 4,763,764 | A * | 8/1988 | Smith ....................... | F16D 3/12 192/104 C |
| 5,139,463 | A * | 8/1992 | Bytzek ..................... | F16D 3/52 474/69 |
| 5,907,524 | A * | 5/1999 | Marmy ................ | G04B 17/066 368/175 |
| 6,044,943 | A * | 4/2000 | Bytzek .................... | F16D 41/20 192/212 |
| 6,083,130 | A * | 7/2000 | Mevissen ................. | F02B 67/06 192/107 T |
| 6,109,227 | A * | 8/2000 | Mott ......................... | F16H 7/06 123/192.2 |
| 6,280,332 | B1 * | 8/2001 | Knutson ................ | F16D 41/206 464/59 |
| 6,561,333 | B2 * | 5/2003 | Larson ..................... | F16D 7/022 192/33 C |

(Continued)

FOREIGN PATENT DOCUMENTS

| | | |
|---|---|---|
| DE | 838968 C | 5/1952 |
| JP | 2010276155 A | 12/2010 |

OTHER PUBLICATIONS

Peter Ward et al; "Isolator Decoupler", U.S. Appl. No. 13/115,204, filed May 25, 2011; USPTO.

(Continued)

*Primary Examiner* — Henry Liu

(74) *Attorney, Agent, or Firm* — Jeffrey A. Thurnau, Esq.; Paul N. Dunlap, Esq.

(57) ABSTRACT

An isolator decoupler comprising a shaft (1), a pulley (2) journalled to the shaft, a torsion spring (10) engaged between the pulley and a carrier (9), the torsion spring loaded in an unwinding direction, a wrap spring (11) engaged between the carrier and the shaft, the wrap spring comprising a cylindrical inner portion (94) and a planar outer portion (93) connected by a tapered portion (155), and the inner portion frictionally engaged with the shaft in a winding direction.

16 Claims, 8 Drawing Sheets

(56) References Cited

U.S. PATENT DOCUMENTS

| | | | | |
|---|---|---|---|---|
| 6,742,640 B1* | 6/2004 | Grogg | F16D 7/022 | 192/35 |
| 6,843,594 B1* | 1/2005 | Moteki | F03G 1/02 | 267/272 |
| 7,070,033 B2* | 7/2006 | Jansen | F16D 41/20 | 192/110 R |
| 7,153,227 B2* | 12/2006 | Dell | F16H 55/36 | 474/70 |
| 7,207,910 B2 | 4/2007 | Dell et al. | | |
| 7,624,852 B2* | 12/2009 | Mevissen | F16D 7/022 | 192/41 S |
| 7,712,592 B2* | 5/2010 | Jansen | F16D 3/52 | 192/41 S |
| 7,874,950 B2* | 1/2011 | Lehtovaara | F16H 7/1281 | 474/112 |
| 8,021,253 B2* | 9/2011 | Dell | F16D 3/02 | 464/57 |
| 8,132,657 B2* | 3/2012 | Antchak | F16D 7/022 | 192/41 S |
| 8,177,669 B2* | 5/2012 | Ishida | F16D 41/206 | 474/166 |
| 8,302,753 B2* | 11/2012 | Antchak | F16D 41/206 | 192/113.32 |
| 8,333,501 B2* | 12/2012 | Levingston | F16F 1/10 | 368/175 |
| 8,534,438 B2* | 9/2013 | Antchak | F16D 41/206 | 192/113.32 |
| 8,678,157 B2* | 3/2014 | Ward | F16D 7/022 | 192/41 R |
| 8,813,928 B2* | 8/2014 | Schneider | F16D 7/022 | 192/41 S |
| RE45,156 E* | 9/2014 | Jansen | F16D 3/52 | 464/60 |
| 8,820,503 B2* | 9/2014 | Schneider | F16D 41/206 | 192/41 S |
| 8,888,619 B2* | 11/2014 | Antchak | F16D 7/022 | 474/74 |
| 8,931,610 B2* | 1/2015 | Serkh | F16D 41/206 | 192/41 S |
| 8,985,293 B2* | 3/2015 | Marion | F16D 13/76 | 192/113.32 |
| 9,033,832 B1* | 5/2015 | Serkh | F16H 55/36 | 474/70 |
| 9,097,335 B2* | 8/2015 | Serkh | F16D 7/022 | |
| 2003/0098214 A1* | 5/2003 | Titus | F16H 55/36 | 192/41 S |
| 2007/0240964 A1* | 10/2007 | Saito | F16D 41/206 | 192/41 S |
| 2009/0176608 A1* | 7/2009 | Jansen | F02B 67/06 | 474/74 |
| 2010/0116617 A1* | 5/2010 | Serkh | F16H 55/36 | 192/41 S |
| 2011/0065537 A1* | 3/2011 | Serkh | F16D 7/022 | 474/94 |
| 2011/0224038 A1* | 9/2011 | Aantchak | F16D 7/022 | 474/94 |
| 2012/0298474 A1* | 11/2012 | Ward | F16D 7/022 | 192/41 S |
| 2013/0092501 A1* | 4/2013 | Schneider | F16D 7/022 | 192/41 S |
| 2013/0217524 A1* | 8/2013 | Antchak | F02B 67/06 | 474/94 |
| 2014/0008175 A1* | 1/2014 | Schneider | F16D 41/206 | 192/41 S |
| 2014/0141892 A1* | 5/2014 | Williams | F16D 41/206 | 464/40 |
| 2014/0305765 A1* | 10/2014 | Serkh | F16D 41/206 | 192/41 S |

OTHER PUBLICATIONS

Xiaohua Chen et al; "Isolator Decoupler", U.S. Appl. No. 13/487,755, filed Jun. 4, 2012; USPTO.

European Patent Office, Invitation to Pay Additional Fees and, Where Applicable, Protest Fee: Communication Relating to the Results of the Partial International Search; Date of Mailing: Oct. 7, 2015.

* cited by examiner

ISOLATING DECOUPLER

FIELD OF THE INVENTION

The invention relates to an isolating decoupler, and more particularly, to an isolating decoupler comprising a wrap spring engaged between the carrier and the shaft, the wrap spring comprising a cylindrical inner portion and a planar outer portion connected by a tapered portion, and the inner portion frictionally engaged with the shaft in a winding direction.

BACKGROUND OF THE INVENTION

Diesel engine use for passenger car applications is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

Due to increased crankshaft vibration plus high acceleration/deceleration rates and high alternator inertia the engine accessory drive system is often experiencing belt chirp noise due to belt slip. This will also reduce the belt operating life.

Crankshaft isolators/decouplers and alternator decouplers/isolators have been widely used for engines with high angular vibration to filter out vibration in engine operation speed range and to also control belt chirp.

Representative of the art is U.S. Ser. No. 13/541,216 which discloses an isolator decoupler having a pulley temporarily engagable with an end of the wrap spring one way clutch in an unwinding direction whereby a temporary contact between the wrap spring one way clutch end and the pulley will temporarily diminish the frictional engagement of the wrap spring one way clutch from the shaft.

What is needed is an isolating decoupler comprising a wrap spring engaged between the carrier and the shaft, the wrap spring comprising a cylindrical inner portion and a planar outer portion connected by a tapered portion, and the inner portion frictionally engaged with the shaft in a winding direction. The present invention meets this need.

SUMMARY OF THE INVENTION

The primary aspect of the invention is an isolating decoupler comprising a wrap spring engaged between the carrier and the shaft, the wrap spring comprising a cylindrical inner portion and a planar outer portion connected by a tapered portion, and the inner portion frictionally engaged with the shaft in a winding direction.

Other aspects of the invention will be pointed out or made obvious by the following description of the invention and the accompanying drawings.

The invention comprises an isolator decoupler comprising a shaft, a pulley journalled to the shaft, a torsion spring engaged between the pulley and a carrier, the torsion spring loaded in an unwinding direction, a wrap spring engaged between the carrier and the shaft, the wrap spring comprising a cylindrical inner portion and a planar outer portion connected by a tapered portion, and the inner portion frictionally engaged with the shaft in a winding direction.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
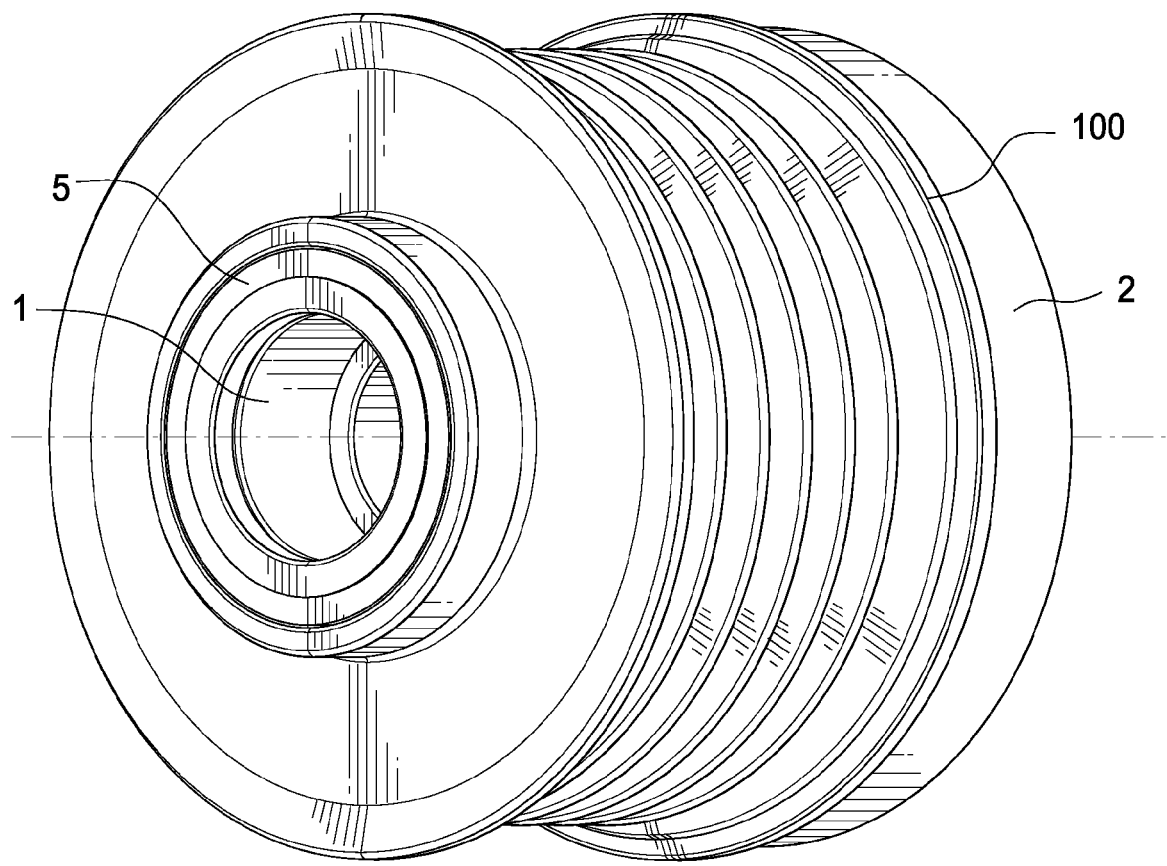
FIG. 1 is a perspective view of the device.
Figure 2:
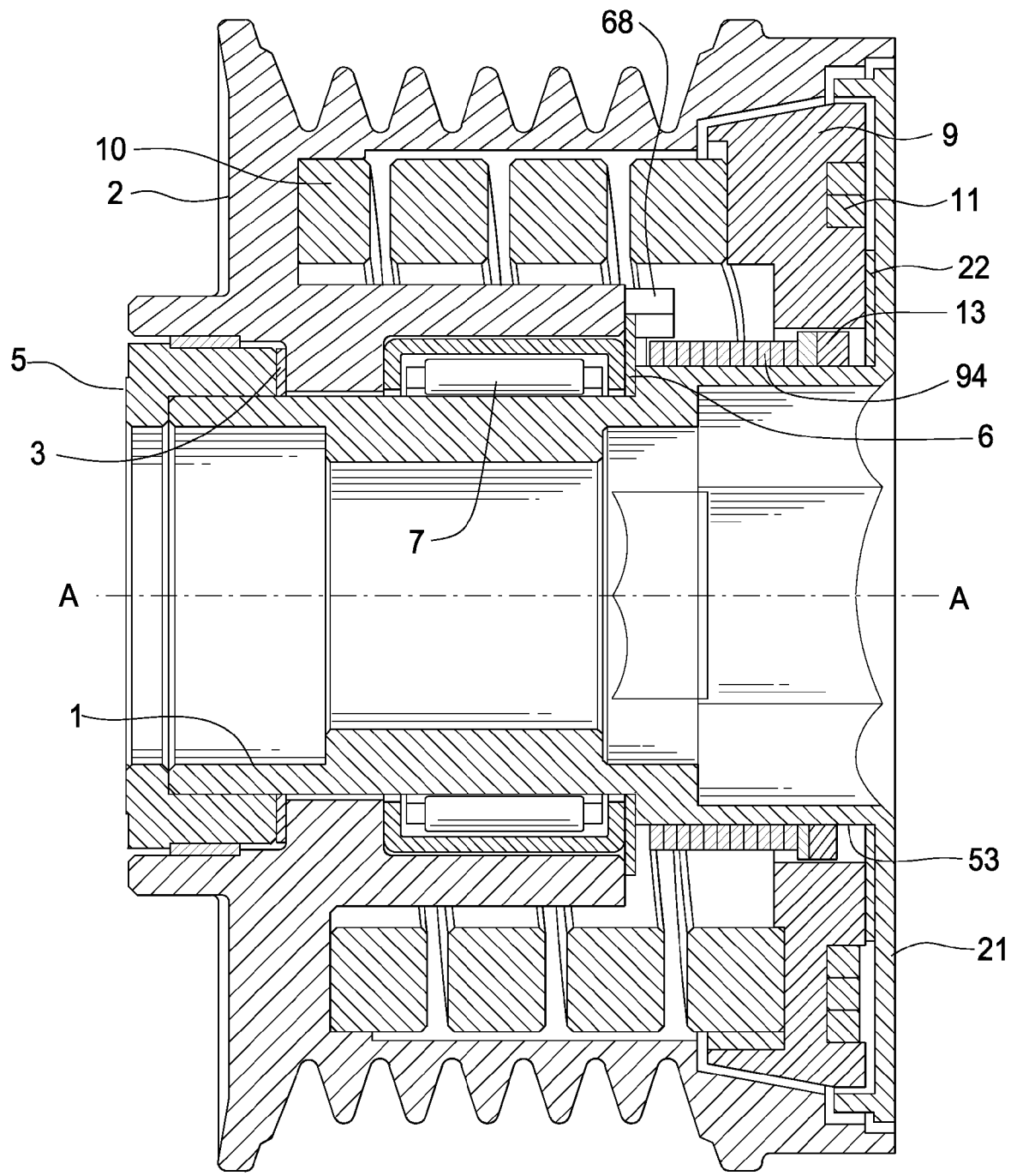
FIG. 2 is a cross-section view of the device.
Figure 3:
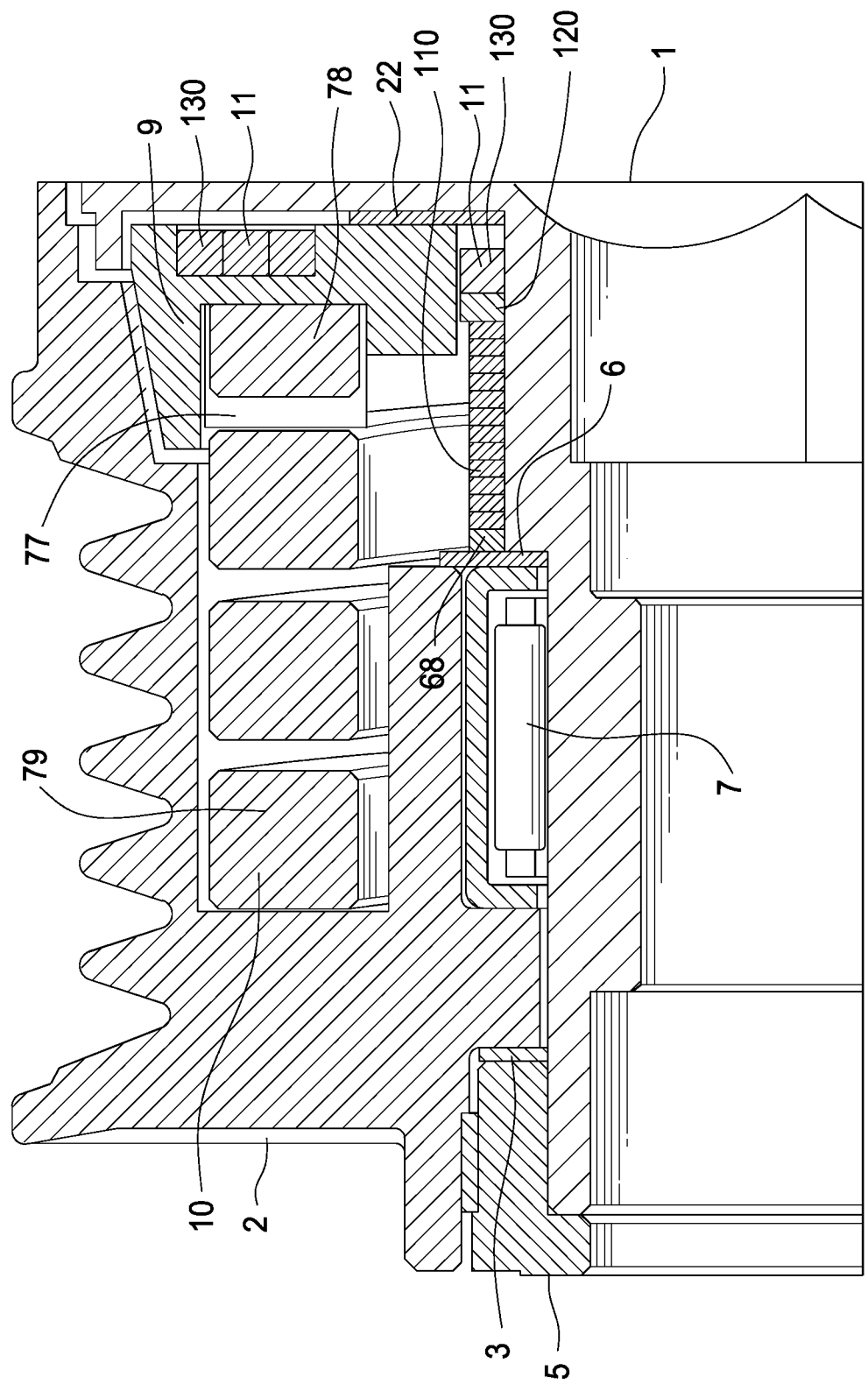
FIG. 3 is a detail of the cross-section view of the device.
Figure 4:
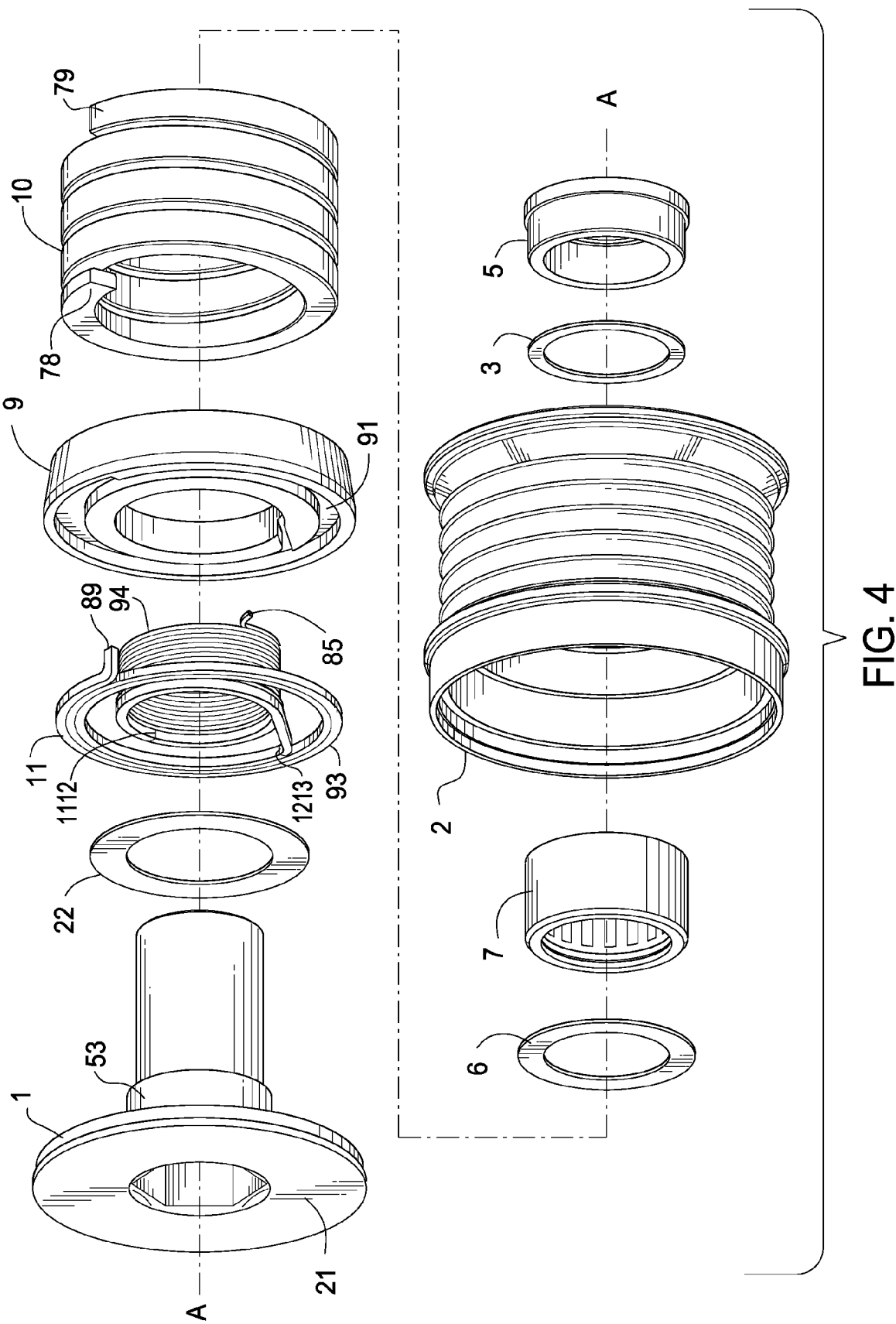
FIG. 4 is an exploded view of the device.
Figure 5A:
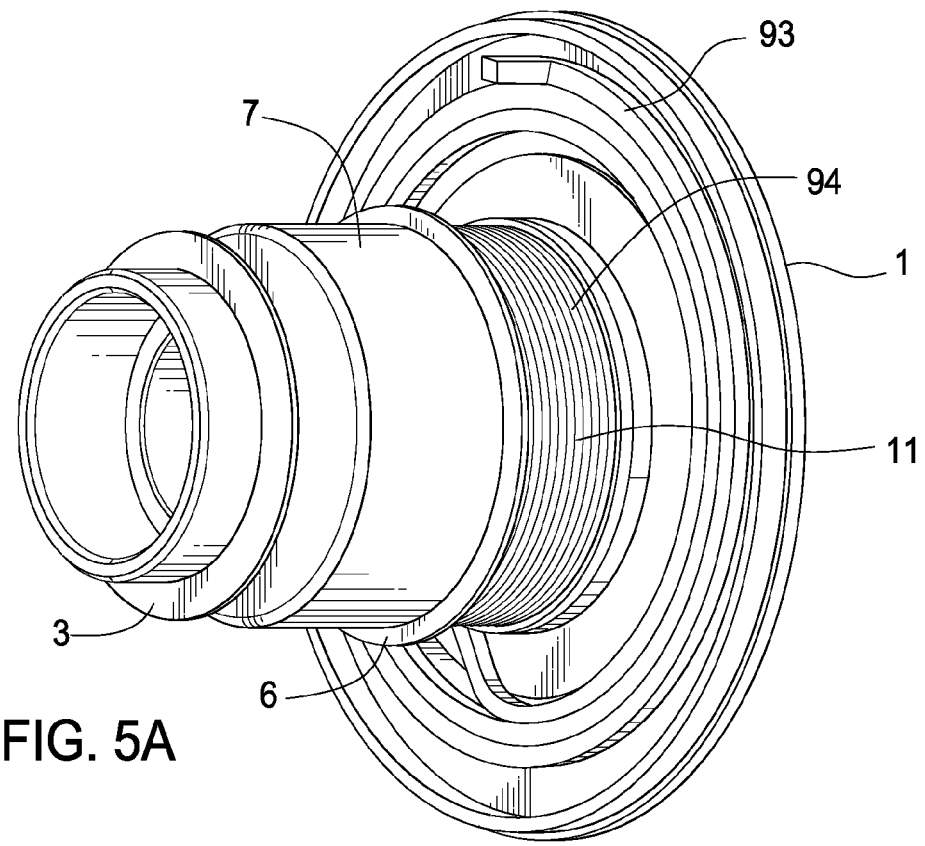
FIG. 5A is a perspective view of the interior of the device.
Figure 5B:
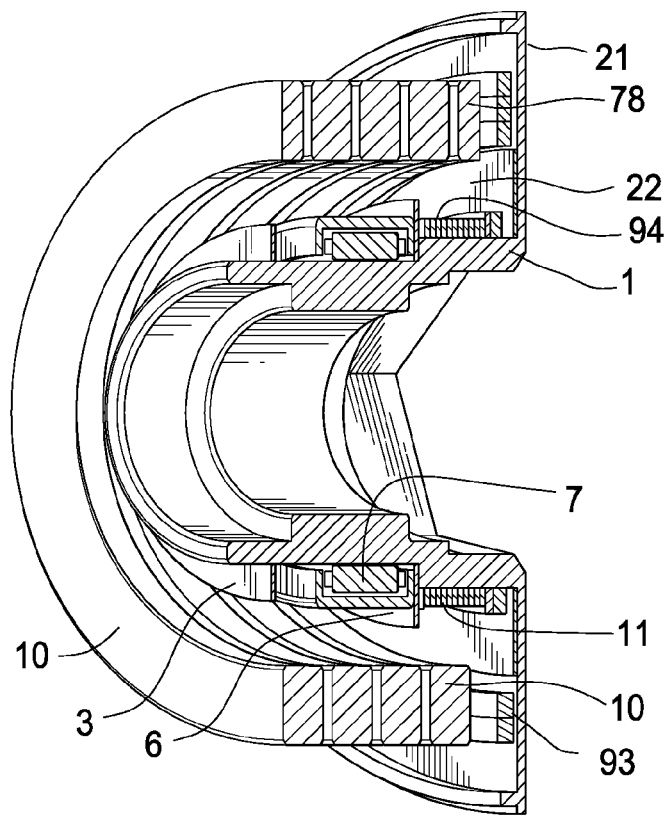
FIG. 5B is a perspective cross-sectional view of the device.
Figure 6:
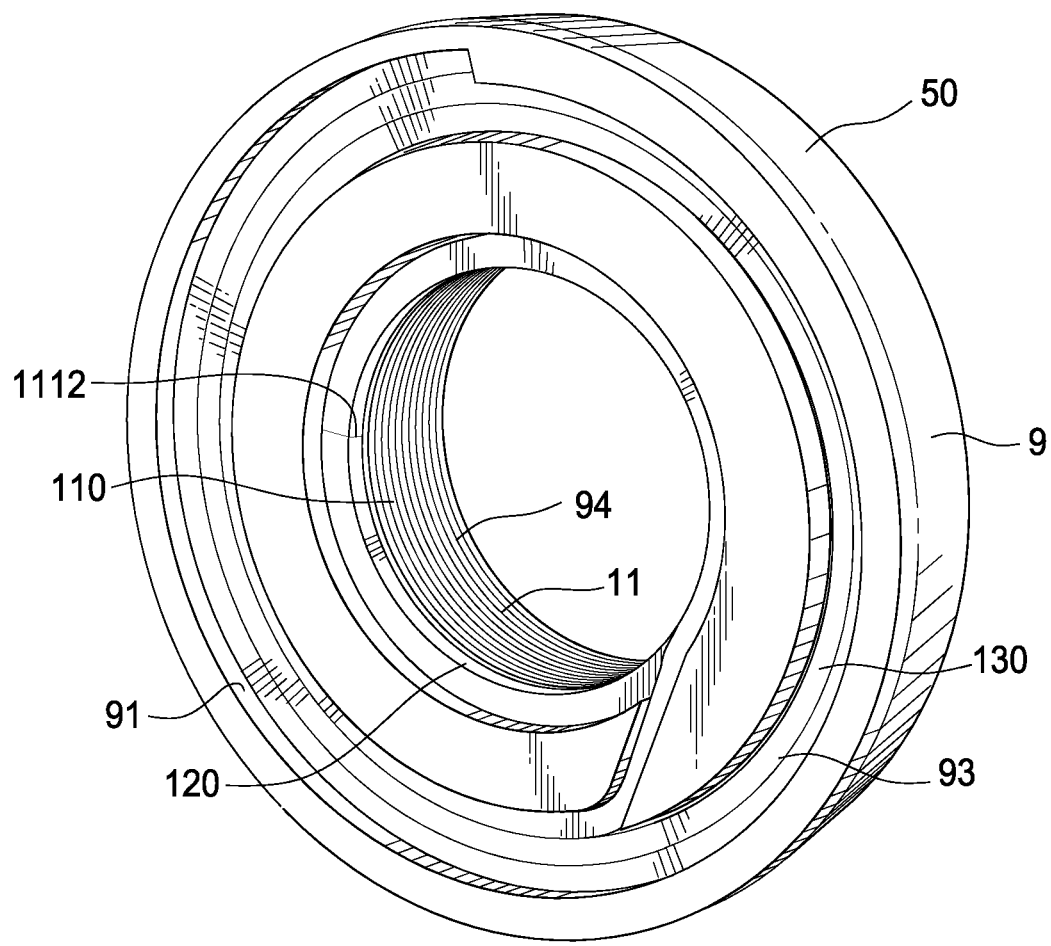
FIG. 6 is a back perspective view of the carrier.
Figure 7:
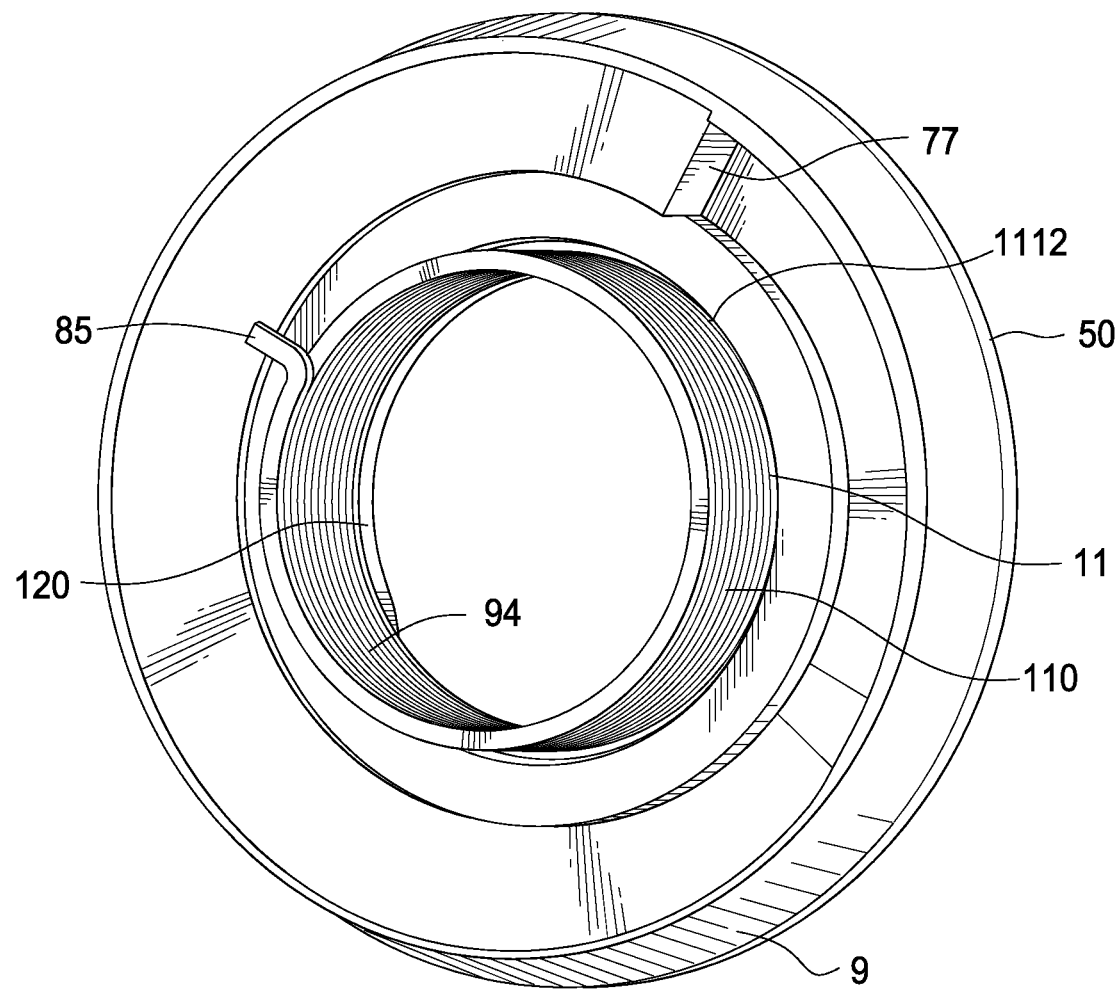
FIG. 7 is a front perspective view of the carrier.

FIG. 1 is a perspective view of the device. FIG. 2 is a cross-section view of the device. Isolating decoupler 100 comprises a pulley 2 which is journalled to a shaft 1 by a bearing 7. Thrust washer 3 is disposed between pulley 2 and end cap 5. Thrust washer 6 is disposed between pulley 2 and shaft 1. Torsion spring 10 is engaged between pulley 2 and carrier 9. Wrap spring 11 is engaged between carrier and shaft 1. Thrust washer 22 is disposed between carrier 9 and radial member 21 of shaft 1. Carrier 9 bears upon thrust washer 22 due to compression of torsion spring between carrier 9 and pulley 2. Carrier 9 and wrap spring 11 comprise the one-way clutch assembly 50. FIG. 6 is a back perspective view of the carrier. FIG. 7 is a front perspective view of the carrier.

Pulley 2 is axially located on shaft 1 between thrust washers 3 and 6, and retained thereon by end cap 5. Upon installation of the device on the shaft of an alternator (not shown), end cap 5 becomes sandwiched between an alternator bearing inner race and shaft 1. This axially fixes the location of the inventive device 100 on the alternator shaft. Shaft 1 can be threadably fastened to the alternator shaft.

FIG. 6 is a back perspective view of the carrier. FIG. 7 is a front perspective view of the carrier. One-way clutch assembly 50 comprises carrier 9 and wrap spring 11. Carrier 9 comprises a face 77. End 78 of torsion spring 10 bears upon face 77. The other end 79 of torsion spring 10 engages pulley 2.

Figure 8:
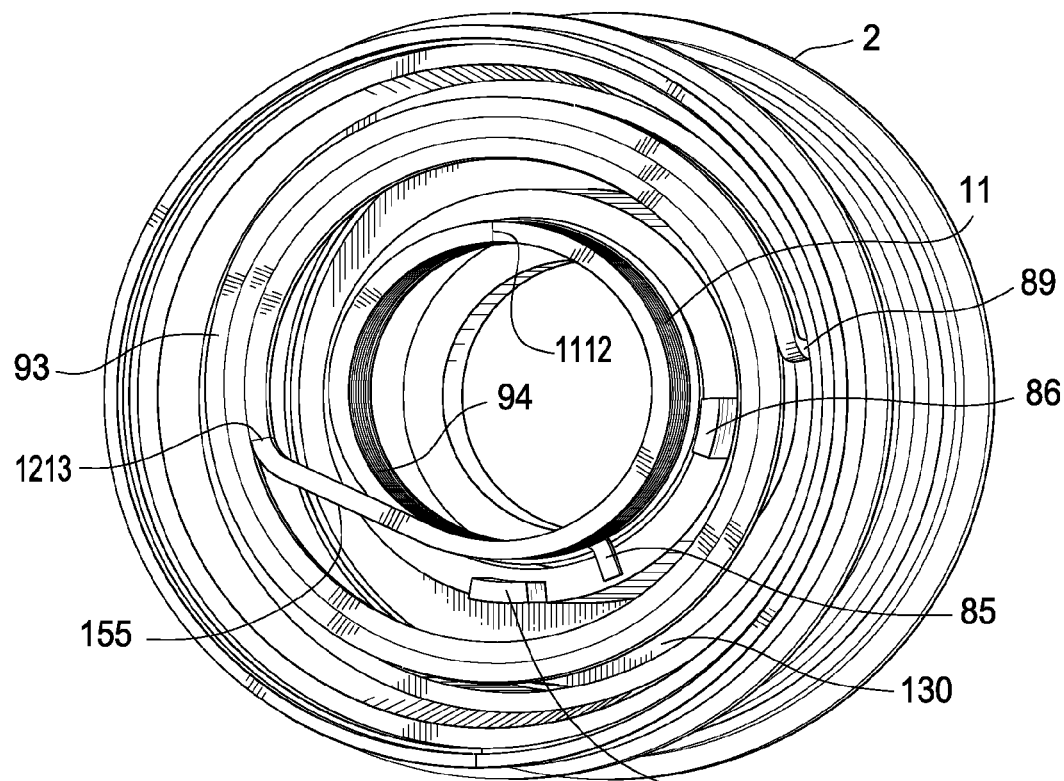
FIG. 8 is a perspective view of the wrap spring and the pulley.

Wrap spring 11 comprises an outer planar spiral coiled portion 93 and an inner cylindrical coiled portion 94, see FIG. 8. FIG. 8 is a perspective view of the wrap spring and the pulley. Planar outer portion 93 and cylindrical inner portion 94 are connected by a tangential portion 155. Portion 155 extends radially outward from and tangentially from inner portion 94. Portion 93 comprises coils having a radius which increases radially outward such that the coils are stacked radially outward one on the next in a radially outward spiraling manner, namely, the coils are coplanar within a plane that extends normally to an axis of rotation A-A. Wrap spring end 85 is torque limiting and end 89 is for receiving torque input.

Wrap spring 11 is engaged between carrier 9 and shaft 1. Wrap spring portion 110 of inner portion 94 frictionally engages shaft surface 53 of shaft 1. Wrap spring outer portion 93 engages carrier 9 in receiving portion 91.

In the inventive device, torque is transmitted from pulley 2 through torsion spring 10 through one-way clutch assembly 50 to shaft 1 in the direction of rotation of pulley 2. Torque is transmitted by wrap spring 11 in the winding direction. Torsion spring 10 is loaded in the unwinding direction. In the unloaded or overrunning direction end 78 may disengage from face 77 or from pulley or both, although this is not preferable since it can cause noise and damage to the device.

Figure 9:
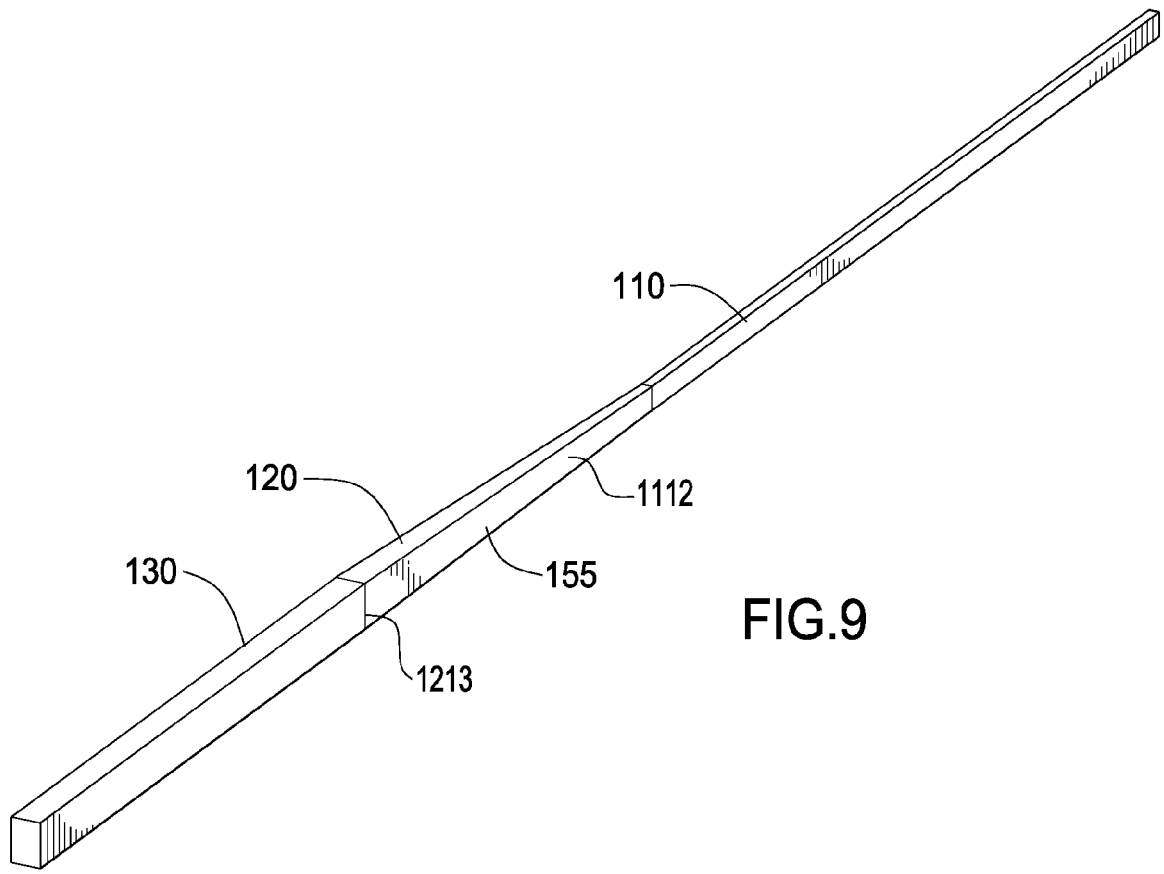
FIG. 9 is a detail of the transition portion of the wrap spring.

FIG. 9 is a detail of the transition portion of the wrap spring. The length of each zone in FIG. 9 is not to scale. Wrap spring 11 comprises a variable cross-section along the axial length of the spring wire. The variable cross-section characteristic comprises three portions or zones: constant cross-section zone 110, variable or tapered cross-section zone 120, and constant cross-section zone 130. The cross-sectional dimension of zone 130 is approximately 1.5 mm×2.5 mm. The cross-sectional dimension of zone 110 is approximately 0.6 mm×1.2 mm. The numerical values given in this specification are examples only and are not intended to limit the scope of the invention.

Zone 130 takes load from carrier 9 at end 89. Carrier 9 is in contact with torsion spring 10 at contact face 77. Zone 130 is wound on a spiral. The spiral nature of zone 130 acts as an energy absorbing interface. For example, as the pulley rotates the coils of zone 130 partially wind and unwind depending on the direction of rotation or acceleration of the pulley. Zone 130 must be fully "wound up" before full torque is transmitted to shaft 1. In this way the wrap spring acts as a compliant member to isolate the alternator from shocks that may be caused by abrupt engine speed changes. This is also the manner in which the torsion spring operates, namely, to allow the alternator shaft to overrun when an engine deceleration occurs.

Wrap spring 11 comprises constant cross-section zone 110 and variable cross-section zone 120. Zone 130 connects to zone 120 at portion 1213. Zone 120 connects to zone 110 at portion 1112. Zone 120 is tapered comprising a cross-sectional dimension that varies from 1.5 mm×2.5 mm at portion 1213 to 0.6 mm×1.2 mm at portion 1112. This transition in cross section occurs gradually from the end of zone 130 through tangential portion 155 and continues through the next two to three coils of inner portion 94. FIG. 9 is a detail of the transition portion of the wrap spring.

Maximum torque for an alternator is in the range of 16-20 N-m. At the connection point between tangential portion 155 and zone 120 operational tension will generate approximately 16 to 20 N-m torque at zone 120. At connection 1120 between zone 120 and zone 110 operational tension will generate torque approximately 6.5 to 10 times less than the maximum torque delivered by torsion spring 10.

For example, the tension in wrap spring 11 can be determined by the following formula:

$$T1/T2 = e^{\mu\phi}$$

Where

T1/T2=tension ratio.

μ=coefficient of friction between wrap spring and shaft.

φ=angle of contact between wrap spring and shaft in radians.

For the given example, with a coefficient of friction of 0.12 and an angle of contact representing three coils 3*2*n=18.85; tension ratio is 9.6. With a coefficient of friction of 0.10; the tension ratio is 6.6. In practical terms since the coefficient of friction may vary it is reasonable to expect the tension ratio to be in the range of approximately 6.5 to 10.

The reduced torque is due to zone 120 generating 17 to 18 N-m torque on shaft 1. At connection 1120 there remains a tensile load within zone 120 that generates about 2 to 3 N-m torque in zone 110. The cross-sectional dimension of zone 110 is approximately 0.6 mm×1.2 mm. Zone 110 comprises 9-10 spring coils.

There is no interference or only a small interference between variable cross-section zone 120 and shaft 1. This means that variable cross-section zone 120 can only transmit 1 to 2 N-m torque through frictional engagement. Zone 110 works as a trigger or a switch for variable cross-section zone 120. Zone 110 has an interference fit with shaft 1 to transmit 2-3 N-m of torque.

In normal operation end 85 of wrap spring 11 does not come into contact with pulley 2. As the torque input through pulley 2 to the device increases the relative distance between tab 68 of pulley 2 with respect to end 85 will decrease. Once contact occurs at a predetermined torque input, further pressing contact (caused by increasing torque) between tab 68 and end 85 will cause wrap spring 11 to progressively disengage from shaft surface 53 thereby allowing pulley 2 to "slip" past shaft 1. This is because a further relative movement of tab 68 against end 85 causes wrap spring 11 to move in the unwinding direction, which increases the diameter of wrap spring 11, which progressively and incrementally disengages wrap spring 11 from shaft surface 53. This progressive or incremental contact causes the magnitude of the frictional engagement between the wrap spring and the shaft to be incrementally reduced by the incremental pressure from the pulley. As the over-torque load increases the wrap spring is further and further unwound from the shaft, thereby allowing the pulley greater freedom to slip past the shaft, which in turn "bleeds" off the high torque. This torque release function protects the device and driven component from an over-torque situation.

Wrap spring 11 is made from a continuous piece of spring wire. The spring wire is produced from a wire having an initial cross-sectional dimension of 1.5 mm×2.5 mm, which is also the cross-section of zone 130. In order to obtain the variable cross section of zone 120 and the smaller cross section of zone 110, each spring wire must be processed. The first step is to cut the spring wire to length. Next, multiple spring wires are loaded in a fixture such that they are parallel, oriented to rest on the 1.5 mm side. The spring wires are then gang ground to obtain a taper from 2.5 mm to 1.2 mm of zone 120 and the 1.2 mm dimension of zone 110. Next the spring wires are removed from the fixture and placed on a magnetic table oriented such that they are parallel and rest on the side formerly 2.5 mm in length (the newly ground 1.2 mm side). The spring wires are then gang ground to obtain the second transition from 1.5 mm to 0.6 mm along zone 120 and the final thickness of 0.6 mm for zone 110. The machined spring wire is then processed on typical spring manufacturing winding equipment into the wound shape of wrap spring 11.

Although a form of the invention has been described herein, it will be obvious to those skilled in the art that variations may be made in the construction and relation of parts without departing from the spirit and scope of the invention described herein.

We claim:

1. An isolator decoupler comprising:
   a shaft (1);
   a pulley (2) journalled to the shaft;
   a torsion spring (10) engaged between the pulley and a carrier (9), the torsion spring loaded in an unwinding direction;
   a wrap spring (11) engaged between the carrier and the shaft;
   the wrap spring comprising a cylindrical inner portion (94) and a planar outer portion (93) connected by a tapered portion (155); and
   the inner portion frictionally engaged with the shaft in a winding direction.

2. The isolator decoupler as in claim 1, wherein the tapered portion extends tangentially to the inner portion.

3. The isolator decoupler as in claim 1, wherein the inner portion comprises a plurality of coils.

4. The isolator decoupler as in claim 1, wherein the pulley is temporarily engagable with the inner portion such that the magnitude of a frictional engagement between the inner portion and the shaft is progressively reduced upon a pressing contact by the pulley.

5. The isolator decoupler as in claim 1, wherein the outer portion is disposed within a carrier receiving portion.

6. The isolator decoupler as in claim 1, wherein a cross-section of the inner portion is less than the cross-section of the outer portion.

7. An isolator decoupler comprising:
a shaft;
a pulley journalled to the shaft;
a torsion spring engaged between the pulley and a carrier, the torsion spring loaded in an unwinding direction;
a wrap spring engaged between the carrier and the shaft;
the wrap spring comprising a cylindrical inner portion extending axially and a coplanar outer portion connected to the inner portion by a tapered portion;
the inner portion frictionally engaged with the shaft in a winding direction; and
the pulley temporarily engagable with the inner portion such that the magnitude of a frictional engagement between the inner portion and the shaft is incrementally reduced upon an increase in torque applied to the pulley.

8. The isolator decoupler as in claim 7, wherein the tapered portion extends tangentially to the inner portion.

9. The isolator decoupler as in claim 7, wherein a cross-section of the inner portion is dimensionally smaller than the outer portion.

10. An isolator decoupler comprising:
a shaft;
a pulley journalled to the shaft;
a torsion spring engaged between the pulley and a carrier, the torsion spring loaded in an unwinding direction;
a wrap spring engaged between the carrier and the shaft;
the wrap spring comprising a cylindrical inner portion and a planar spiral outer portion connected by a tangential portion;
the inner portion frictionally engaged with the shaft in an inner portion winding direction; and
the inner portion incrementally releasable from the frictional engagement with the shaft upon a pressing contact by the pulley.

11. The isolator decoupler as in claim 10, wherein the outer portion is disposed within a carrier receiving portion.

12. The isolator decoupler as in claim 10, wherein a cross-section of the inner portion is dimensionally smaller than the outer portion.

13. The isolator decoupler as in claim 10 further comprising:
a first thrust member and second thrust member axially constraining the pulley on the shaft; and
an end member retaining the pulley on the shaft.

14. The isolator decoupler as in claim 10, wherein the tangential portion is tapered.

15. The isolator decoupler as in claim 10, wherein the inner portion comprises a plurality of coils extending along a rotational axis A-A.

16. An isolator decoupler comprising:
a shaft;
a pulley journalled to the shaft;
a spring engaged between the pulley and a carrier, the spring loaded in an unwinding direction;
a wrap spring engaged between the carrier and the shaft;
the wrap spring comprising a cylindrical inner portion and a planar spiral outer portion, the outer portion engaged with the carrier;
the inner portion frictionally engaged with the shaft in a winding direction; and
the inner portion frictional engagement incrementally releasable from the shaft upon application of an incremental pressure by the pulley to the inner portion.

\* \* \* \* \*